United States Patent [19]

Schmitz

[11] 3,846,756

[45] Nov. 5, 1974

[54] PROGRAMMABLE SEQUENTIAL LOGIC CIRCUIT

[75] Inventor: Lawrence S. Schmitz, Plumboro, Pa.

[73] Assignee: Westinghouse Electric Corporation, Pittsburgh, Pa.

[22] Filed: June 25, 1973

[21] Appl. No.: 373,345

[52] U.S. Cl.... 340/147 MD, 340/152 R, 340/149 A

[51] Int. Cl. .......................................... H04q 5/00

[58] Field of Search ..... 340/147 MD, 152 R, 149 A

[56] References Cited

UNITED STATES PATENTS 3,569,935 3/1971 Sieracki .......................... 340/152 R

*Primary Examiner*—Harold I. Pitts

*Attorney, Agent, or Firm*—M. P. Lynch

[57] ABSTRACT

The modification of a programmable read only memory circuit. One or more of the outputs are supplied as feedback signals to corresponding inputs transforms the conventional read only memory circuit into a circuit capable of memory and sequential logic functions.

5 Claims, 3 Drawing Figures

PATENTED NOV 5 1974 3,846,756

INPUT ADDRESS / STORED WORD (32 LOCATIONS)

| | INPUT ADDRESS S1 | S2 | S3 | S4 | S5 | STORED WORD 01 | 02 | 03 | 04 | 05 | 06 | 07 | 08 | |
|---|---|---|---|---|---|---|---|---|---|---|---|---|---|---|
| k | 0 | 0 | 0 | 0 | 0 | 0 | 0 | 0 | 0 | 0 | 1 | 0 | 1 | ← TAMPER LOCATION |
| | 0 | 0 | 0 | 0 | 1 | 0 | 0 | 0 | 0 | 0 | 0 | 0 | 1 | |
| e | 0 | 0 | 0 | 1 | 0 | 0 | 0 | 0 | 1 | 1 | 0 | 1 | 0 | ← LOCK OPEN LOCATION |
| d | 0 | 0 | 0 | 1 | 1 | 0 | 0 | 0 | 1 | 1 | 0 | 1 | 1 | |
| | 0 | 0 | 1 | 0 | 0 | 0 | 0 | 0 | 0 | 0 | 0 | 0 | 1 | |
| | 0 | 0 | 1 | 0 | 1 | 0 | 0 | 0 | 0 | 1 | 0 | 0 | 1 | |
| | 0 | 0 | 1 | 1 | 0 | 0 | 0 | 1 | 0 | 0 | 0 | 0 | 1 | |
| | 0 | 0 | 1 | 1 | 1 | 0 | 0 | 1 | 0 | 1 | 0 | 0 | 1 | |
| | 0 | 1 | 0 | 0 | 0 | 0 | 0 | 0 | 0 | 0 | 0 | 0 | 1 | |
| | 0 | 1 | 0 | 0 | 1 | 0 | 1 | 0 | 0 | 0 | 0 | 0 | 1 | |
| c | 0 | 1 | 0 | 1 | 0 | 0 | 1 | 0 | 1 | 1 | 0 | 1 | 1 | |
| c' | 0 | 1 | 0 | 1 | 1 | 0 | 1 | 0 | 1 | 1 | 0 | 1 | 1 | |
| | 0 | 1 | 1 | 0 | 0 | 0 | 1 | 0 | 0 | 0 | 0 | 0 | 1 | |
| | 0 | 1 | 1 | 0 | 1 | 0 | 1 | 1 | 0 | 0 | 0 | 0 | 1 | |
| b | 0 | 1 | 1 | 1 | 0 | 0 | 1 | 1 | 1 | 0 | 0 | 1 | 1 | |
| | 0 | 1 | 1 | 1 | 1 | 0 | 0 | 1 | 1 | 1 | 0 | 0 | 1 | |
| j | 1 | 0 | 0 | 0 | 0 | 0 | 0 | 0 | 0 | 0 | 0 | 0 | 1 | |
| | 1 | 0 | 0 | 0 | 1 | 1 | 0 | 0 | 0 | 0 | 0 | 0 | 1 | |
| | 1 | 0 | 0 | 1 | 0 | 1 | 0 | 0 | 0 | 0 | 0 | 0 | 1 | |
| | 1 | 0 | 0 | 1 | 1 | 1 | 0 | 0 | 0 | 1 | 0 | 0 | 1 | |
| | 1 | 0 | 1 | 0 | 0 | 1 | 0 | 0 | 0 | 0 | 0 | 0 | 1 | |
| | 1 | 0 | 1 | 0 | 1 | 1 | 0 | 1 | 0 | 0 | 0 | 0 | 1 | |
| | 1 | 0 | 1 | 1 | 0 | 1 | 0 | 1 | 0 | 0 | 0 | 0 | 1 | |
| | 1 | 0 | 1 | 1 | 1 | 1 | 0 | 0 | 1 | 1 | 0 | 0 | 1 | |
| i | 1 | 1 | 0 | 0 | 0 | 1 | 0 | 0 | 0 | 0 | 0 | 0 | 1 | |
| | 1 | 1 | 0 | 0 | 1 | 1 | 1 | 0 | 0 | 0 | 0 | 0 | 1 | |
| | 1 | 1 | 0 | 1 | 0 | 1 | 1 | 0 | 0 | 0 | 0 | 0 | 1 | |
| | 1 | 1 | 0 | 1 | 1 | 1 | 1 | 0 | 0 | 1 | 0 | 0 | 1 | |
| h | 1 | 1 | 1 | 0 | 0 | 1 | 1 | 0 | 0 | 0 | 0 | 0 | 1 | |
| g | 1 | 1 | 1 | 0 | 1 | 1 | 1 | 1 | 0 | 0 | 0 | 0 | 1 | |
| a | 1 | 1 | 1 | 1 | 0 | 1 | 1 | 1 | 1 | 0 | 0 | 1 | 1 | |
| | 1 | 1 | 1 | 1 | 1 | 1 | 1 | 1 | 1 | 1 | 0 | 1 | 1 | ← RESET LOCATION |

S1 S2 S3 S4 S5

TAMPER (bit 07)

FIG. 3

PROGRAMMABLE SEQUENTIAL LOGIC CIRCUIT

BACKGROUND OF THE INVENTION

There exists numerous requirements for electronic circuitry capable of memory and logic functions to provide necessary control requirements in such systems as elevators, security system installations, etc.

In many security systems a key lock is used to read a code in order to arm or disarm the system. Presently available mechanical code lock switches are expensive and relatively difficult to operate once the combination has been entered. While the advent of electronic code lock switches has overcome the disadvantages of mechanical systems, the currently available electronic code lock systems are relatively complex and expensive.

SUMMARY OF THE INVENTION

There is described herein an electronic programmable sequential logic circuit concept which utilizes a conventional programmable read only memory (PROM) as the primary electronic circuit component to satisfy the requirements for memory and sequential logic functions. The novel concept disclosed herein relates to the application of one or more digital output signals from the conventional PROM as feedback signals to corresponding inputs. The feedback signals function to provide latching of the various digital input signals such that the introduction of a predetermined sequence of digital input signals which satisfy the stored program in the PROM can be utilized to effect an output control function, i.e., open a door lock.

DESCRIPTION OF THE DRAWINGS

The invention will become more readily apparent from the following exemplary description in connection with the accompanying drawings:

FIG. 3 is a truth table corresponding to a typical implementation of the invention utilizing a programmable read only memory illustrated in FIG. 2.

DESCRIPTION OF THE PREFERRED EMBODIMENT

Figure 1:
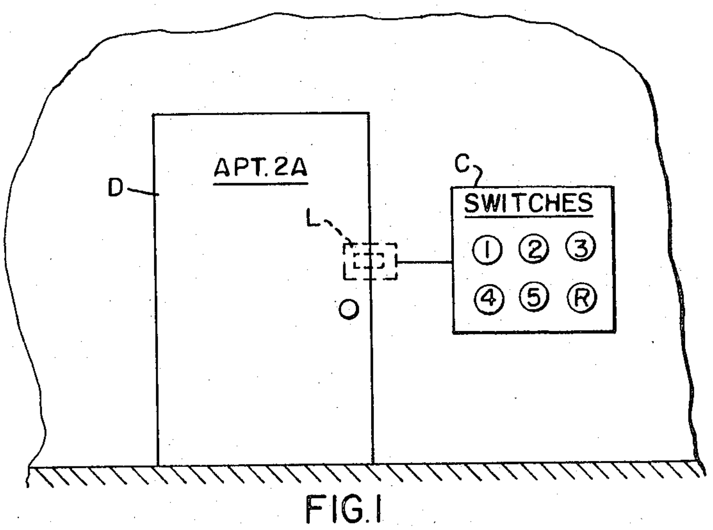
FIG. 1 is a pictorial representation of the embodiment of the invention in a security system for an apartment.

Referring to FIG. 1 there is illustrated an entrance to an apartment having a lock L, the operation of which is controlled by a console C which is mounted adjacent to the door D. The actuation of the lock L by the console C is a function of a sequence of actuation of the input entry switches herein illustrated to consist of five switches S1, S2, S3, S4 and S5. It will be apparent from the following description that the number of input entry switches is a matter of designer's choice and will be determined in part by the complexity of the logic operation required. A reset switch SR is provided to reset the input entry switches to a stable reference state.

Figure 2:
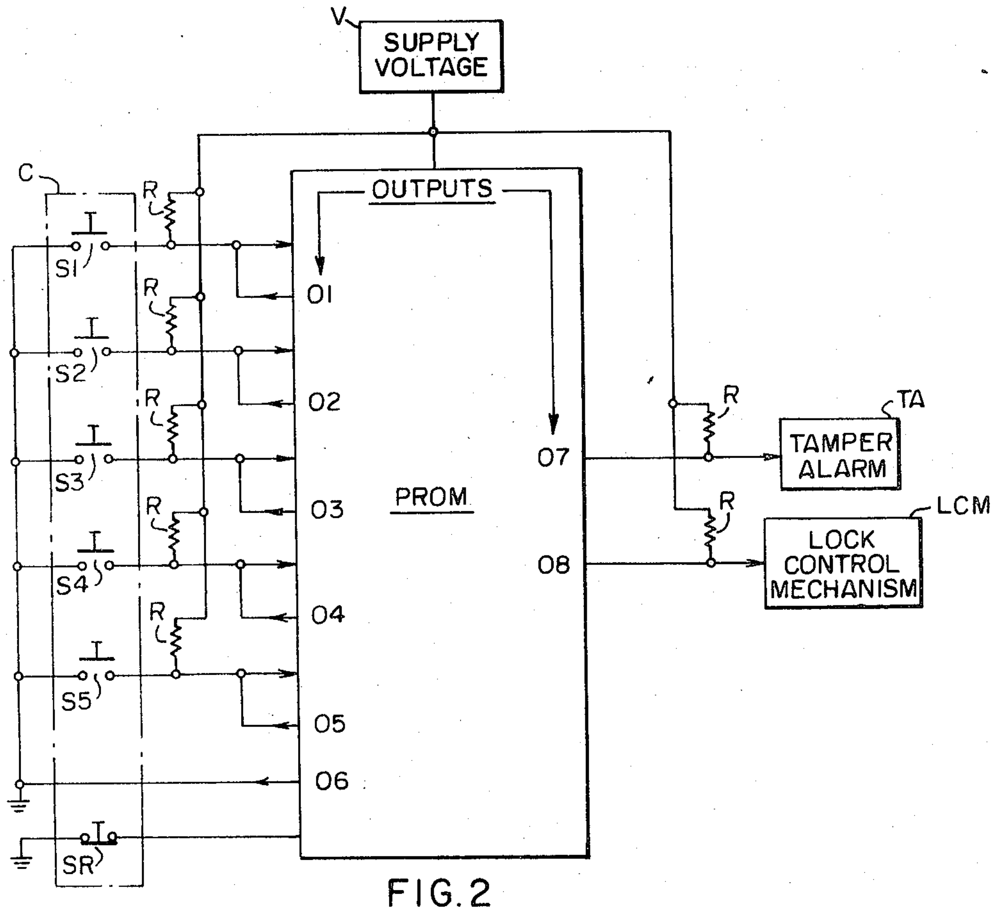
FIG. 2 is a schematic illustration of a typical programmable read only memory modified to function in accordance with the invention.

The implementation of a programmable sequential logic circuit concept utilizing a conventional read only memory is schematically illustrated in FIG. 2. For the purpose of discussion, there is illustrated a 32 × 8 PROM available from Intersil Corp. and commercially identified as IM5600. It is emphasized that while the discussion of the invention will be based on the modification of the programmable read only memory IM5600 for use in a security system, neither the specific PROM nor the application to a security system is meant in any way to exhaust the potential utilization of the invention. The basic schematic illustration of FIG. 2 illustrates the PROM as having five digital inputs corresponding to the input entries which are S1, S2, S3, S4 and S5 and a reset input corresponding to reset input switch SR. The PROM is illustrated schematically as having eight outputs 01–08. A typical PROM configuration consists of a diode matrix wherein the stored program is developed by shorting a predetermined pattern of diodes.

It is noted in the schematic illustration of FIG. 2 that the outputs 01–05 are connected back in a feedback relationship to the corresponding five inputs of the PROM. The remaining three outputs 06, 07 and 08 are utilized to provide functions such as activation of the input entry switches, indication of lock tampering, and the development of the lock open signal in the event the proper sequence of actuation of the input entry switches is registered.

The technique of providing feedback from one or more of the digital outputs of the PROM directly to corresponding inputs converts the conventional programmable read only memory into a sequential logic circuit in that the respective feedback signals effect a latching operation at the respective inputs when the input information satisfies the stored program in the programmable read only memory. The truth table illustrated in FIG. 3 illustrates a typical stored program in the PROM and clearly illustrates the sequential logic operation produced by the latching of digital signals at the inputs when the programmed sequence of inputs is satisfied by the proper sequence of operation of the input switches. The feedback technique and the resulting latching operation permits enumerable combinations of switch actuation sequences to satisfy the desired output control function. In the truth table of FIG. 3 a proper sequence of operation of five input switches will produce a lock open signal, any other sequence will produce a tamper signal.

The excitation for the PROM circuit is provided by voltage supply V.

In the security system embodiment illustrated in FIG. 2 the output 06 is utilized to provide excitation signals to the input switches while the output 07 is designated to actuate a tamper alarm circuit TA in the event a sequence of operations of the input switches does not correspond to the sequence defined by the stored information in the PROM. The output 08 is utilized to transmit a lock open signal to the lock control mechanism LCM in the event the sequence of operations of the input switches corresponds to that stored in the PROM.

The stored program of the PROM as illustrated in the truth table of FIG. 3 consists of 32 locations with each location including a stored word. The stored words each consist of five digital bits. The digital information introduced by the operation of the five input switches comprise an input address consisting of five digital bits. Assume the system is at a reset state wherein the input address as reflected by the digital information present on the five inputs corresponds to five logic ones present at the reset location of the truth table. The subsequent actuation of one of the five input switches S1–S5 converts the corresponding input to a logic zero causing the PROM to seek a new stored work location having a digital value corresponding to the new input address. In the event the stored word at a location reflects the same digital value as the input address, a digital output signal of a logic zero is supplied as a feedback signal to the PROM input corresponding to the actuated input switch to latch the logic zero at the input in a stable state. This briefly defines the operation of the PROM in accordance with the stored program.

In the embodiment illustrated the logic one digital input signals correspond to the voltage level developed across the input resistors R by the voltage source V. The logic zero digital input signals correspond to electrical ground which is connected to an input by the actuation of an input switch.

In the truth table of FIG. 3 there is presented a particular input switch actuating sequence for producing a lock open signal. The truth table effectively defines the available binary digital input address available and the stored program of the programmable read only memory. The PROM represented by the truth table of FIG. 3 has been programmed to produce a lock open signal providing the actuation of the input switches follows the sequence S5, S1, S3, S2, S5. The additional capability of utilizing the same switch twice, i.e. S5, is illustrated in the truth table of FIG. 3.

It will be noted from the following discussion of the truth table of FIG. 3 that the stored program established within the PROM is such as to require the changing of the state of but one bit in an input address as the PROM is sequenced from one stable location to the next. The use of this programming concept which avoids attempting to change the state of more than one bit in response to a digital input signal eliminates the need for traditional discriminating circuitry and permits the direct feedback of the output signal to the input to provide the latching operation described herein. Conventional logic systems operating in a latching mode and designed to simultaneously change the condition of more than one bit generally require the use of discriminating and timing circuits in order to compensate for the fact that two or more bits generally will not change precisely at the same instant. The program locations not utilizing feedback need not be restricted to the single bit change procedure but may, in fact, be programmed to change the condition of more than one bit of an input address at a particular location.

Assume for the purpose of discussion that the reset switch SR has been actuated thus placing the PROM in the reset location. The sequential logic operation of the PROM in accordance with the truth table of FIG. 3 will be first described relative to the proper sequential operation of the input switches and will subsequently be described relative to an improper sequential operation of the input switches.

The operation of the input switch S5 develops an input address reflecting logic ones in the first four bit positions and a logic zero in the fifth bit position which corresponds to the stored word in the PROM program location *a*. This coincidence develops a logic zero output signal which is applied as a feedback signal to the input switch S5 thus latching the logic zero digital input signal in a stable state. A subsequent operation of input switch S1 develops an input address having logic zeros in the first and fifth bit positions and logic ones in the remaining bit positions which corresponds to the stored word in location *b* of the PROM program. Once again, this producing a logic zero output is applied as a feedback signal to the switch S1 input causing latching of a logic zero digital signal at the S1 input. The actuation of input switch S3 produces an input address exhibiting logic zeros at the first, third and fifth bit position and logic ones at second and fourth bit positions which correspond to the stored word present at location *c* of the PROM program. It is noted however that in the fifth bit positions of the stored word present in PROM location *c* is not a logic zero but a logic one while the logic state of the remaining four positions correspond to the logic states of the input address. This inconsistency causes the PROM to sequence to a change in the input address and location having a stored word whose digital value corresponds to the digital value of the stored word in location *c*. This causes the PROM to sequence to the location *c'* wherein it is noted that the digital value of the stored word satisfies this condition. This operation of the PROM program which has resulted in the conversion of the fifth bit position of the input address from a logic zero to a logic one effectively unlatches the digital signal at the input corresponding to switch S5 thus making switch S5 available for use a second time in the sequence of digital input signals. It is noted as a practical consideration that the S5 switch was not reset for additional use immediately after it was first used. A period of at least two intervening switch actuations is preferred before resetting an input in order to assure stable operation.

The subsequent actuation of input switch S2 produces an input address wherein the first, second and third bit positions are logic zeros while the remaining bit positions are logic ones. This causes the PROM to sequence to location *d*. It is noted that the digital value of the stored word at location *d* is identical to the digital value of the input address thus resulting in a logic zero digital output signal which is provided as a feedback signal to the input of switch S2 causing a latching of the logic zero input in a stable state. The actuation of input switch S2 develops an input address which sequences the PROM to location *e* wherein the stored word reflects logic zero conditions in the first, second, third and fifth bit positions which corresponds to the digital value of the input address developed by the input switches. The coincidence achieved at location *e* results in the generation of an output signal from output 08 which indicates the completion of a predetermined sequence of operation of input switches in an order defined by the stored program. This output signal in the embodiment of FIG. 1 is a lock open signal which is transmitted to a lock control mechanism LCM. The presence of a logic one in the fifth bit position of the stored word in location *e*, which does not coincide with the logic zero in the corresponding position of the input address, functions to limit the duration of the lock open signal.

Assume once again the reset switch SR is actuated and PROM is sequenced to the reset location.

For the purpose of discussing the tamper sequence of operation which results from an improper sequence of operation of the input switches, it is assumed that the input switch S4 is actuated. The actuation of input switch S4 develops an input address of a logic one in the first second, third and fifth bit positions with a logic zero in the fourth bit position. This input address causes the PROM to sequence to location *g*. It is noted, however, that the stored word at location *g* does not correspond to the input address thus causing a change in the input address to coincide with the stored word of location *g*. The PROM is then sequenced to location *h*. It is noted, however, once again that the stored word at location *h* does not correspond to the new input address thus requiring a change in one bit of the input address to develop a new input address identical to the stored word of location *h*. The PROM is then sequenced to location *i*. Again the digital value of the stored word at location *i* does not correspond to the digital value of newly developed input stored address. The input address is changed again in like manner and the PROM is sequenced to location *i*. However, the stored word present at location *i* reflects logic zeros in all bit positions which does not correspond to the digital value of the new input address. The input address is again changed and the PROM is sequenced to location *k*, wherein the stored word reflects logic zeros in all bit positions which represents a digital value identical to the digital value of the input address. It is noted that location *k* corresponds to the tamper location. A tamper signal is generated when the PROM is sequenced to location *k* and the tamper signal is transmitted to actuate the tamper alarm circuit TA of FIG. 2. In practical operation, a lapsed time of less than one microsecond occurs from the time an improper input switch is actuated and the tamper alarm signal is generated.

It is emphasized once again that the particular PROM selected and the truth table illustrated herein are merely for the purpose of discussion. Furthermore, the particular PROM selected for illustration of the invention is one of relatively few inputs and outputs. It has been selected to provide a relatively simple and clear description of the novel technique of providing feedback to assure latching of logic input states. Therefore the sequential logic circuit operation achieved through the use of direct feedback can be applied to far more complex PROM applications.

I claim as my invention:

1. A sequential logic circuit comprising logic memory means having a plurality of inputs and outputs and including a stored program including a plurality of locations each including stored word consisting of one or more bits, digital input means connected to said inputs of said logic memory means to provide sequential entry of digital signals at said inputs, the sequential application of digital signals to said inputs of said logic memory means developing an input address comprised of a number of bits corresponding to the number of bits of said stored words, said logic memory means adapted to respond to said digital signals applied to said inputs by sequencing through one or more locations of said stored program to a location wherein the stored word exhibits a digital value equivalent to the digital value of the input address, the sequencing of an input address from one location to another causing the change of only one bit of said input address, the presence of a stored word having a digital value corresponding to the digital value of the input address causing said logic memory means to develop a digital output signal indicative thereof, and feedback means for directly connecting one or more of said outputs of said logic memory means to one or more of said inputs to apply said digital output signal to the input of said logic memory means that entered said digital signal to latch said digital signal at said input in a stable state.

2. A sequential logic circuit as claimed in claim 1 wherein said logic memory means is comprised of a programmable read only memory.

3. A sequential logic circuit as claimed in claim 1 wherein the number of inputs of said logic memory means corresponds to the number of bits in said input addresses and each of said inputs corresponds to a bit location in said input addresses, the entry of a digital signal at one of said inputs causing said logic memory means to sequence to a new location relfecting the change in said bit.

4. A sequential logic circuit as claimed in claim 1 wherein the entry of a predetermined sequence of digital signals at said inputs of said logic memory means results in the development of feedback signals for sequentially latching each of said digital signals at the respective inputs, said logic memory means producing a control output signal when the entry of said predetermined sequence of said digital signals is completed.

5. A sequential logic circuit as claimed in claim 4 wherein the entry of a digital signal not in accord with the stored program causes said logic memory means to produce a second control output signal.

* * * * *